United States Patent
Liu et al.

(10) Patent No.: US 9,608,466 B2
(45) Date of Patent: Mar. 28, 2017

(54) CHARGING CONTROL METHOD AND CHARGING ASSEMBLY

(71) Applicant: CHERVON INTELLECTUAL PROPERTY LIMITED, Road Town (VG)

(72) Inventors: Lei Liu, Nanjing (CN); Haiyan Li, Nanjing (CN); Junya Duan, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 191 days.

(21) Appl. No.: 14/565,876

(22) Filed: Dec. 10, 2014

(65) Prior Publication Data

US 2015/0188335 A1    Jul. 2, 2015

(30) Foreign Application Priority Data

Dec. 26, 2013    (CN) .......................... 2013 1 0733942

(51) Int. Cl.
*H02J 7/00*        (2006.01)
(52) U.S. Cl.
CPC ............... *H02J 7/008* (2013.01); *Y02B 40/90* (2013.01); *Y02E 70/40* (2013.01)
(58) Field of Classification Search
CPC ......... H02J 7/0021; H02J 7/007; H02J 7/0052
USPC ....................................................... 320/112
See application file for complete search history.

(56) References Cited

U.S. PATENT DOCUMENTS

| | | | | |
|---|---|---|---|---|
| 5,818,199 A * | 10/1998 | Beard | ................... | H01M 10/44 320/116 |
| 6,028,415 A * | 2/2000 | Nagai et al. | ........... | G11O 5/141 320/137 |
| 6,469,472 B1 * | 10/2002 | Aoshima et al. | ..... | H02J 7/0044 320/122 |
| 7,768,229 B2 * | 8/2010 | Zhang et al. | ....... | B60L 11/1844 307/10.1 |
| 7,977,913 B2 * | 7/2011 | Tan et al. | .............. | H01M 10/44 307/134 |
| 8,248,032 B2 * | 8/2012 | Ozeki et al. | .......... | H02J 7/0018 320/124 |
| 2014/0368170 A1 * | 12/2014 | Tang et al. | .......... | B60L 11/1816 320/137 |

* cited by examiner

*Primary Examiner* — Sun Lin
(74) *Attorney, Agent, or Firm* — Greenberg Traurig, LLP

(57) ABSTRACT

A charging assembly and a charging control method are provided for charging a battery pack according to an actual voltage of a battery in a battery pack. The charging assembly includes a battery pack having a battery with a rated charging current, a charger having a charging module for outputting an output voltage and an output current, and a charging circuit between the charging module and the battery. A method of operation includes: detecting the output current and the output voltage; calculating an actual voltage value on the battery; and determining whether to decrease or keep the output current or increase the output current of the charging module.

19 Claims, 2 Drawing Sheets

CHARGING CONTROL METHOD AND CHARGING ASSEMBLY

RELATED APPLICATION INFORMATION

This application claims the benefit of CN 201310733942.6, filed on Dec. 26, 2013, the disclosure of which is incorporated herein by reference in its entirety.

FIELD OF THE DISCLOSURE

The present disclosure relates generally to charging control methods and charging assemblies.

BACKGROUND OF THE DISCLOSURE

As types of chargers available in the market are increasing, competition between products gets intensified. The length of the charging duration of chargers with the same power is directly associated with user experience, so there is a pressing need to improve the charging efficiency.

The charging procedure of an ordinary charger comprises two phases, namely, a constant-current phase and a constant voltage phase. According to a control method employed by an ordinary charger, due to inaccuracy of detection and compensation method, a constant preset charging voltage cannot be accurately applied on a battery cell assembly in the constant voltage phase of the charging procedure so that the battery cell assembly is always charged with a voltage smaller than the preset charging voltage, thus the charging efficiency is reduced relative to a preset time.

The statements in this section merely provide background information related to the present disclosure and may not constitute prior art.

SUMMARY

In one aspect of the disclosure, a charging assembly is provided for increasing charging efficiency. The charging assembly comprises a battery pack comprising a battery with a rated charging current, a charger comprising a charging module for outputting an output voltage and an output current, and a charging circuit between the charging module and the battery.

Preferably, the charger further comprises a control module electrically connected with the charging module, a voltage detecting module for detecting the output voltage of the charging module, and a current detecting module for detecting the output current of the charging module.

The voltage detecting module and the current detecting module are electrically connected to the control module; the charging module is capable of applying a charging voltage on the battery, and the control module is capable of controlling the charging module to adjust the charging voltage on the battery according to an equivalent resistance value of the charging circuit between the charging module and the battery.

Preferably, the charging circuit comprises a first charging circuit for connecting the charging module to the positive electrode of the battery, and a second charging circuit for connecting the charging module to the negative electrode of the battery.

Furthermore, the first charging circuit may comprise a first charger circuit in the charger and a first battery circuit in the battery pack; and the second charging circuit comprises a second charger circuit in the charger and a second battery circuit in the battery pack.

Furthermore, the control module may be provided with a self-check mode which is capable of detecting equivalent resistance value of the first charger circuit and the second charger circuit by controlling the voltage detecting module and the current detecting module when the first charger circuit and the second charger circuit connected with each other by a user.

In another aspect of the disclosure, a charging control method is provided for controlling the assembly described above. The method comprises: detecting the output current value $I1$ and the output voltage value $U1$ of the charging module; calculating an actual voltage value $U2$ on the battery according to $U2=U1-I1 \times R$, wherein $R$ is a equivalent resistance value of a charging circuit between the charging module and the battery; determining whether the actual voltage value $U2$ is higher than or equal to a preset charging voltage value; if yes, decreasing or keeping the output current of the charging module; if no, increasing the output current of the charging module.

Further areas of applicability will become apparent from the description provided herein. It should be understood that the description and specific examples are intended for purposes of illustration only and are not intended to limit the scope of the present disclosure.

Figure 1:
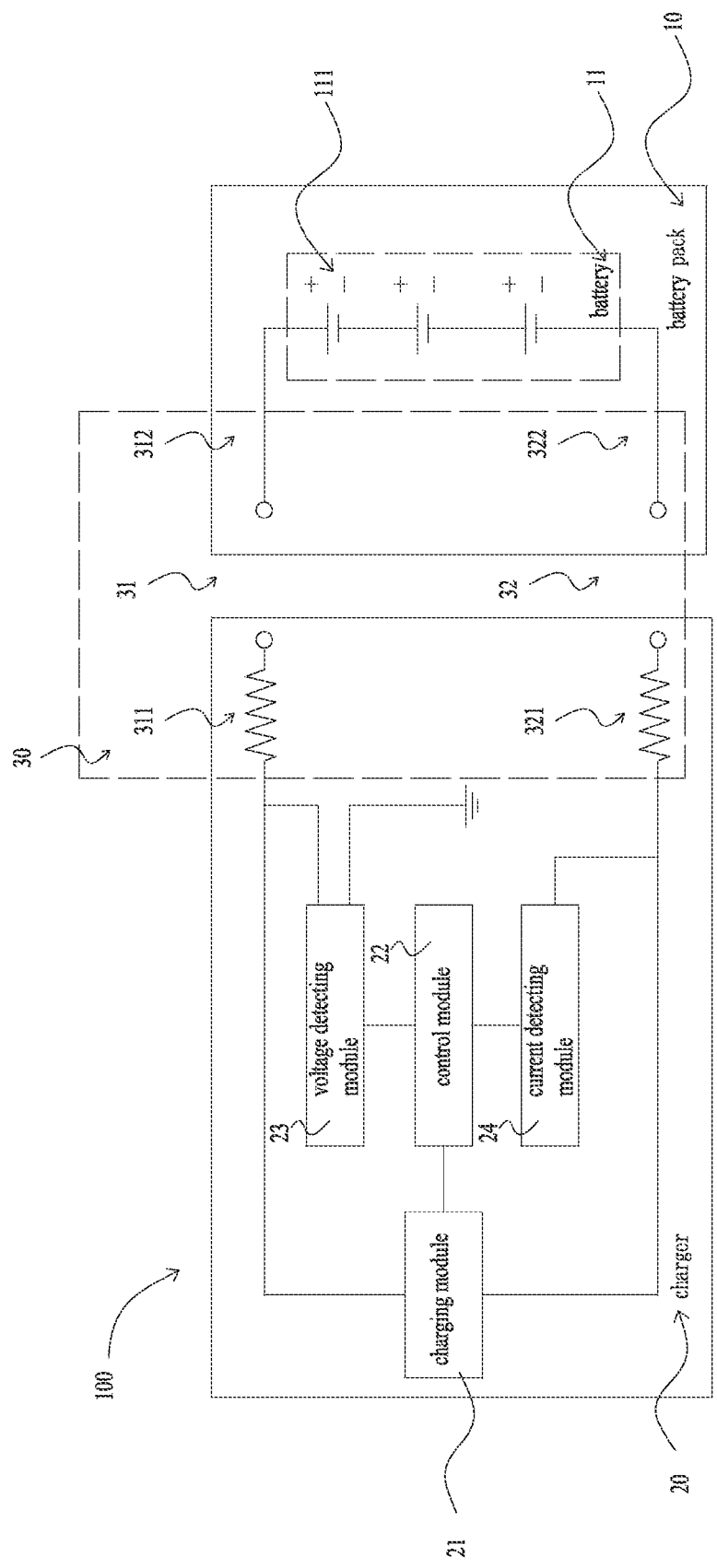
FIG. 1 is a block diagram of an exemplary configuration of a charging assembly according the present disclosure.

The drawings described herein are for illustrative purposes only of exemplary embodiments and not all possible implementations, and are not intended to limit the scope of the claims hereinafter presented. Corresponding reference numerals indicate corresponding parts throughout the several views of the drawings.

DETAILED DESCRIPTION

The following description of the preferred embodiments is merely exemplary in nature and is in no way intended to limit the scope of the invention as claimed, its application, or uses.

As shown in FIG. 1, an exemplary charging assembly 100 mainly comprises a battery pack 10, a charger 20 and a charging circuit 30.

The battery pack 10 comprises a battery 11 with a rated charging current. The battery 11 consists of at least one battery cell 111.

The charger 20 comprises a charging module 21 for outputting an output voltage and an output current, a control module 22 electrically connected with the charging module 21, a voltage detecting module 23 for detecting the output voltage of the charging module 21, and a current detecting module 24 for detecting the output current of the charging module 21.

The voltage detecting module 23 and the current detecting module 24 are electrically connected to the control module 22; the charging module 21 is capable of applying a charging voltage on the battery 11, and the control module 22 is capable of controlling the charging module 21 to adjust the charging voltage on the battery 11 according to an equivalent resistance value of the charging circuit 30 between the charging module 21 and the battery 11.

Preferably, the control module 22 comprises a MCU chip with a clock frequency is in a range of 32 KHz-24 MHz.

Preferably, the charging circuit 30 between the charging module 21 and the battery 11 comprises a first charging circuit 31 for connecting the charging module 21 to the positive electrode of the battery 11 and a second charging circuit 32 for connecting the charging module 21 to the negative electrode of the battery 11.

Specifically, the first charging circuit 31 comprises a first charger circuit 311 in the charger 20 and a first battery circuit 312 in the battery pack 10; and the second charging circuit 32 comprises a second charger circuit 321 in the charger 20 and a second battery circuit 322 in the battery pack 10.

The equivalent resistance value of the charging circuit 30 is to be detected and stored in the control module 22 when the charger 20 and the battery pack 10 are fabricated.

In another way, the control module 22 is provided with a self-check mode which is capable of detecting an equivalent resistance value of the first charger circuit 311 and the second charger circuit 321 by controlling the voltage detecting module 23 and the current detecting module 24 when the first charger circuit 311 and the second charger circuit 321 are connected with each other by a user.

Generally, the equivalent resistance value of the first battery circuit 312 and the second circuit is far less than the equivalent resistance value of the first charger circuit 311 and the second charger circuit 321, so the self-check mode is provided for collecting a data of an equivalent resistance value which is approximately equal to the actual equivalent resistance value of the charging circuit 30 between the charging module 21 and the battery 11.

Figure 2:
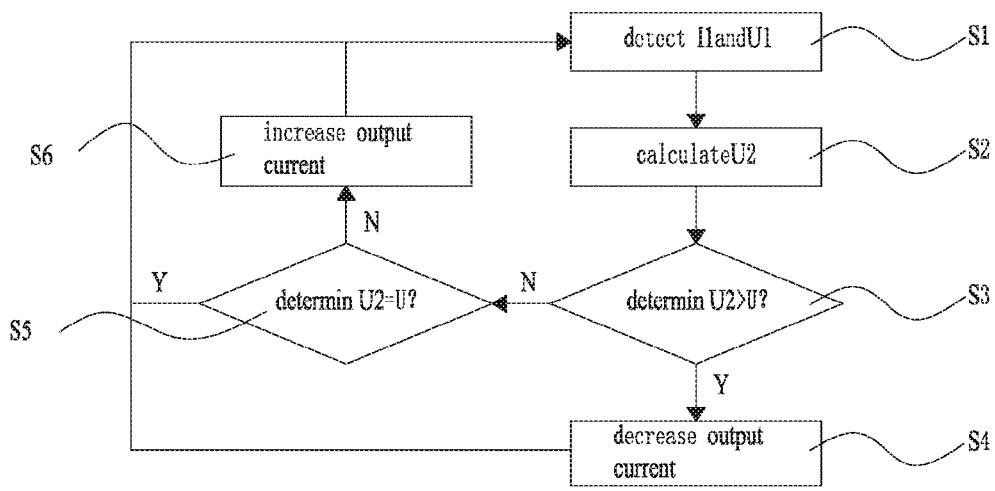
FIG. 2 is a flowchart illustrating an exemplary charging control method according the present disclosure.

As shown in FIG. 2, an exemplary charging control method comprises the following steps:

S1: detecting the output current value I1 and the output voltage value U1 of the charging module 21 by a current detecting module 24 and a voltage detecting module 23.

S2: calculating an actual voltage value U2 on the battery 11 according to $U2=U1-I1\times R$ by a control module 22, wherein R is an equivalent resistance value of a charging circuit 30 between the charging module 21 and the battery 11 which is stored in the control module 22.

S3: determining whether the actual voltage value U2 is higher than a preset charging voltage value by the control module 22, and proceeding to step S4 if yes, or proceeding to step S5 if no.

S4: decreasing the output current of the charging module 21, and returning to step S1.

S5: determining whether the actual voltage value U2 is equal to the preset charging voltage value by the control module 22, keeping the output current of the charging module 21 and returning to step S1 if yes, or proceeding to step S6 if no.

S6: increasing the output current of the charging module 21, and returning to step S1.

Preferably, the output current of the charging module 21 is decreased by 0.3%-10% of the rated charging current every time in step S4 by the control module 22, and the output current of the charging module 21 is increased by 0.3%-10% of the rated charging current every time in step S6 by the control module 22.

Figure 3:
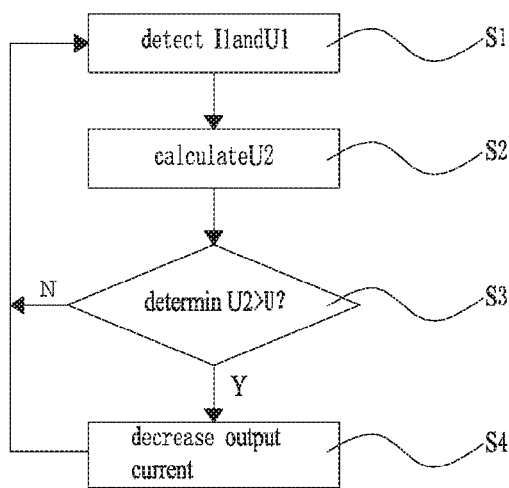
FIG. 3 is a flowchart illustrating another exemplary charging control method according the present disclosure.

As shown in FIG. 3, another exemplary charging control method comprises the following steps:

S1: detecting the output current value I1 and the output voltage value U1 of the charging module 21 by a current detecting module 24 and a voltage detecting module 23.

S2: calculating an actual voltage value U2 on the battery 11 according to $U2=U1-I1\times R$ by a control module 22, wherein R is an equivalent resistance value of a charging circuit 30 between the charging module 21 and the battery 11 which is stored in the control module 22.

S3: determining whether the actual voltage value U2 is higher than a preset charging voltage value by the control module 22, and proceeding to step S4 if yes, or proceeding to step S5 if no.

S4: decreasing the output current of the charging module 21, and returning to step S1.

According to the above methods, the effect of charging with the preset charging voltage can be accurately achieved even in a dynamic charging procedure.

Experimentation was carried out on several sets of identical charger 20s and battery pack 10s, with identical power quantity standard as full-charge standard. By comparing the method according to the above embodiment with the ordinary charging method with the preset charging voltage value U, the time saved by the method according to the present invention is about 20% of the total time used by the ordinary charging method. Therefore, the method of the present invention can effectively reduce the charging time and improve the charging efficiency.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A charging control method for controlling a charger comprising a charging module for outputting an output voltage and an output current to charge a battery pack comprising a battery with a rated charging current, the charging control method comprising:
   detecting an output current value I1 and an output voltage value U1 of the charging module;
   calculating an actual voltage value U2 on the battery according to $U2=U1-I1\times R$, wherein R is an equivalent resistance value of a charging circuit between the charging module and the battery;
   determining whether the actual voltage value U2 is higher than or equal to a preset charging voltage value; and
   when it is determined that the actual voltage value U2 is higher than or equal to the preset charging voltage value, decreasing or keeping the output current of the charging module, otherwise increasing the output current of the charging module.

2. The charging control method according to claim 1, wherein the output current of the charging module is decreased by 0.3%-10% of the rated charging current every time after it is determined that the actual voltage value U2 is higher than the preset charging voltage value.

3. The charging control method according to claim 1, wherein the output current of the charging module is increased by 0.3%-10% of the rated charging current every time after it is determined that the actual voltage value U2 is lower than the preset charging voltage value.

4. A charging control method for controlling a charger comprising a charging module for outputting an output voltage and an output current to charge a battery pack comprising a battery with a rated charging current, the charging control method comprising:
   (a) detecting an output current value I1 and an output voltage value U1 of the charging module;
   (b) calculating an actual voltage value U2 on the battery according to $U2=U1-I1\times R$, wherein R is an equivalent resistance value of a charging circuit between the charging module and the battery;

(c) determining whether the actual voltage value U2 is higher than a preset charging voltage value, and proceeding to step (d) when it is determined that the actual voltage value U2 is higher than the preset charging voltage value otherwise proceeding to step (e);

(d) decreasing the output current of the charging module and returning to step (a);

(e) determining whether the actual voltage value U2 is equal to the preset charging voltage value, keeping the output current of the charging module, and returning to step (a) when it is determined that the actual voltage value U2 is equal to the preset charging voltage value otherwise proceeding to step (f); and (f) increasing the output current of the charging module and returning to step (a).

5. The charging control method according to claim 4, wherein the output current of the charging module is decreased by 0.3%-10% of the rated charging current every time in the step (d).

6. The charging control method according to claim 4, wherein the output current of the charging module is increased by 0.3%-10% of the rated charging current every time in the step (f).

7. A charging control method for controlling a charger comprising a charging module for outputting an output voltage and an output current to charge a battery pack comprising a battery with a rated charging current, the charging control method comprising:

(a) detecting an output current value I1 and an output voltage value U1 of the charging module;

(b) calculating an actual voltage value U2 on the battery according to U2=U1−I1×R, wherein R is an equivalent resistance value of a charging circuit between the charging module and the battery;

(c) determining whether the actual voltage value U2 is higher than a preset charging voltage value, and when it is determined that the actual voltage value U2 is higher than the preset charging voltage value proceeding to step (d) otherwise returning to step (a); and (d) decreasing the output current of the charging module, and returning to step (a).

8. The charging control method according to claim 7, wherein the output current of the charging module is decreased by 0.3%-10% of the rated charging current every time in the step (d).

9. A charging control method for controlling a charger comprising a charging module for outputting an output voltage and an output current to charge a battery pack comprising a battery with a rated charging current, the charging control method comprising:

detecting an output current value I1 and an output voltage value U1 of the charging module by a current detecting module and a voltage detecting module;

calculating an actual voltage value U2 on the battery according to U2=U1−I1×R by a control module, wherein R is an equivalent resistance value of a charging circuit between the charging module and the battery which is stored in the control module;

determining whether the actual voltage value U2 is higher than or equal to a preset charging voltage value by the control module and, when it is determined that the actual voltage value U2 is higher than or equal to the preset charging voltage value decreasing or keeping the output current of the charging module by the control module, otherwise increasing the output current of the charging module.

10. The charging control method according to claim 9, wherein the output current of the charging module is decreased by 0.3%-10% of the rated charging current every time after it is determined that the actual voltage value U2 is higher than the preset charging voltage value by the control module.

11. The charging control method according to claim 9, wherein the output current of the charging module is increased by 0.3%-10% of the rated charging current every time after it is determined that the actual voltage value U2 is lower than the preset charging voltage value by the control module.

12. A charging control method for controlling a charger comprising a charging module for outputting an output voltage and an output current to charge a battery pack comprising a battery with a rated charging current, the charging control method comprising:

(a) detecting an output current value I1 and an output voltage value U1 of the charging module by a current detecting module and a voltage detecting module;

(b) calculating an actual voltage value U2 on the battery according to U2=U1−I1×R by a control module, wherein R is an equivalent resistance value of a charging circuit between the charging module and the battery which is stored in the control module;

(c) determining whether the actual voltage value U2 is higher than a preset charging voltage value by the control module and, when it is determined that the actual voltage value U2 is higher than the preset charging voltage value proceeding to step (d), otherwise proceeding to step (e);

(d) decreasing the output current of the charging module, and returning to step (a);

(e) determining whether the actual voltage value U2 is equal to the preset charging voltage value by the control module, keeping the output current of the charging module and, when it is determined that the actual voltage value U2 is equal to the preset charging voltage value returning to step (a), otherwise proceeding to step (f); and (f) increasing the output current of the charging module, and returning to step (a).

13. The charging control method according to claim 12, wherein the output current of the charging module is decreased by 0.3%-10% of the rated charging current every time in step (d) by the control module.

14. The charging control method according to claim 12, wherein the output current of the charging module is increased by 0.3%-10% of the rated charging current every time in step (f) by the control module.

15. A charging control method for controlling a charger comprising a charging module for outputting an output voltage and an output current to charge a battery pack comprising a battery with a rated charging current, the charging control method comprising:

(a): detecting the output current value I1 and the output voltage value U1 of the charging module by a current detecting module and a voltage detecting module;

(b): calculating an actual voltage value U2 on the battery according to U2=U1−I1×R by a control module, wherein R is an equivalent resistance value of a charging circuit between the charging module and the battery which is stored in the control module;

(c): determining whether the actual voltage value U2 is higher than a preset charging voltage value by the control module, and when it is determined that the actual voltage value U2 is higher than the preset charging voltage value proceeding to step (d), otherwise returning to step (a); and (d) decreasing the output current of the charging module, and returning to step (a).

16. The charging control method according to claim 15, wherein the output current of the charging module is decreased by 0.3%-10% of the rated charging current every time in the step (d) by the control module.

17. A charging assembly, the charging assembly comprising:
a battery pack comprising a battery with a rated charging current;
a charger comprising a charging module for outputting an output voltage and an output current; and
a charging circuit between the charging module and the battery;
wherein the charger further comprises:
a control module electrically connected with the charging module,
a voltage detecting module for detecting the output voltage of the charging module, and
a current detecting module for detecting the output current of the charging module;
wherein the voltage detecting module and the current detecting module are electrically connected to the control module; the charging module is adapted to apply a charging voltage on the battery, and the control module is adapted to control the charging module to adjust the charging voltage on the battery according to an equivalent resistance value of the charging circuit between the charging module and the battery.

18. The charging assembly according to claim 17, wherein the control module comprises a Microprogrammed Control Unit (MCU) chip with a clock frequency in a range of 32 KHz-24 MHz.

19. The charging assembly according to claim 17, wherein the charging circuit between the charging module and the battery comprises:
a first charging circuit for connecting the charging module to a positive electrode of the battery; and
a second charging circuit for connecting the charging module to a negative electrode of the battery;
wherein the first charging circuit comprises a first charger circuit in the charger and a first battery circuit in the battery pack;
wherein the second charging circuit comprises a second charger circuit in the charger and a second battery circuit in the battery pack;
wherein the control module is provided with a self-check mode which is adapted to detect an equivalent resistance value of the first charger circuit and the second charger circuit by controlling the voltage detecting module and the current detecting module when the first charger circuit and the second charger circuit are connected with each other by a user.

* * * * *